(12) United States Patent
Horng (10) Patent No.: US 8,187,694 B2
(45) Date of Patent: *May 29, 2012

(54) COMPOSITE PLATE MEMBER

(76) Inventor: Chin-Hsing Horng, Kueishan Hsiang (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/870,799

(22) Filed: Aug. 28, 2010

(65) Prior Publication Data

US 2012/0052248 A1 Mar. 1, 2012

(51) Int. Cl.
*B32B 3/10* (2006.01)
*B32B 15/04* (2006.01)

(52) U.S. Cl. ........ 428/172; 428/131; 428/132; 428/133; 428/457

(58) Field of Classification Search ............. 428/99, 428/131, 132, 133, 134, 137, 457, 596, 597; 52/673
See application file for complete search history.

(56) References Cited

U.S. PATENT DOCUMENTS

5,656,353 A * 8/1997 Butler .................... 428/133
* cited by examiner

*Primary Examiner* — Catherine A Simone (57) ABSTRACT

A composite plate member having a high tensile strength is disclosed to include a metal plate member having opposing outer face and bonding face and binding units located on the bonding face, each binding unit having binding strips formed of a part of the bonding face and respectively obliquely extending from the bonding face at a predetermined angle, and a plastic plate member directly molded on the bonding face of the metal plate member by insert molding to have the binding strips be embedded in the plastic plate member.

7 Claims, 11 Drawing Sheets

COMPOSITE PLATE MEMBER

BACKGROUND OF THE INVENTION

1. Field of the Invention

The present invention relates to composite plate members and more particularly, to a composite plate member formed of a metal plate member and a plastic plate member, which avoids separation between the metal plate member and the plastic plate member.

2. Description of the Related Art

Following fast development of science and technology, the design concept of commercial electronic products is focused on light, thin, short and small characteristics. Many electronic products (cell phone, notebook, PDA, etc.) are made convenient to carry by user. To enhance mobility, the weight of electronic products must be reduced. In order to reduce the weight, the shell or casing of an electronic product may be formed of an outer metal layer having a relatively thinner wall thickness and an inner plastic layer having a relatively thicker wall thickness. This design greatly reduces the product weight while providing excellent tensile strength. Further, the outer metal layer facilitates surface treatment by an electroplating or coating technique. Therefore, metal is commonly used for the casing or the outer layer of the casing for commercial electronic products.

When setting a plastic plate member in a metal plate member to give a support, an adhesive is usually used to bond the two plate members together. However, this method has drawbacks as follows:

1. The metal plate member and the plastic plate member are separately made, complicating the manufacturing process and increasing the manufacturing cost.

2. After hardened, the volume of the adhesive is slightly reduced (due to vaporization of fluid), and tiny open spaces may exist in between the metal plate member and the plastic plate member, lowering the product yield rate.

3. The metal plate member and the plastic plate member may be twisted when the user opens or closes the electronic product, and the torsional force thus produced may cause separation of the adhesive from the metal plate member and/or the plastic plate member, resulting in plate member separation damage.

4. When bonding the metal plate member and the plastic plate member together, the hardening time of the applied adhesive prolongs the product manufacturing time. Further, the use of the adhesive relatively increases the manufacturing cost of the product, weakening the competitive advantage.

SUMMARY OF THE INVENTION

The present invention has been accomplished under the circumstances in view. It is the main object of the present invention to provide a composite plate member formed of a metal plate member and a plastic plate member, which avoids separation between the metal plate member and the plastic plate member. It is another object of the present invention to provide a composite plate member, which has the characteristics of simple manufacturing process and low manufacturing cost.

To achieve these and other objects of the present invention, a composite plate member comprises a metal plate member having opposing outer face and bonding face and a plastic plate member directly molded on the bonding face of the metal plate member by insert molding. The metal plate member has binding units located on the bonding face. Each binding unit comprises a plurality of binding strips formed of a part of the bonding face and respectively obliquely extending from the bonding face at a predetermined angle. The binding strips are embedded in the plastic plate member to enhance the binding strength between the metal plate member and the plastic plate member.

DETAILED DESCRIPTION OF THE PREFERRED EMBODIMENT

Figure 1:
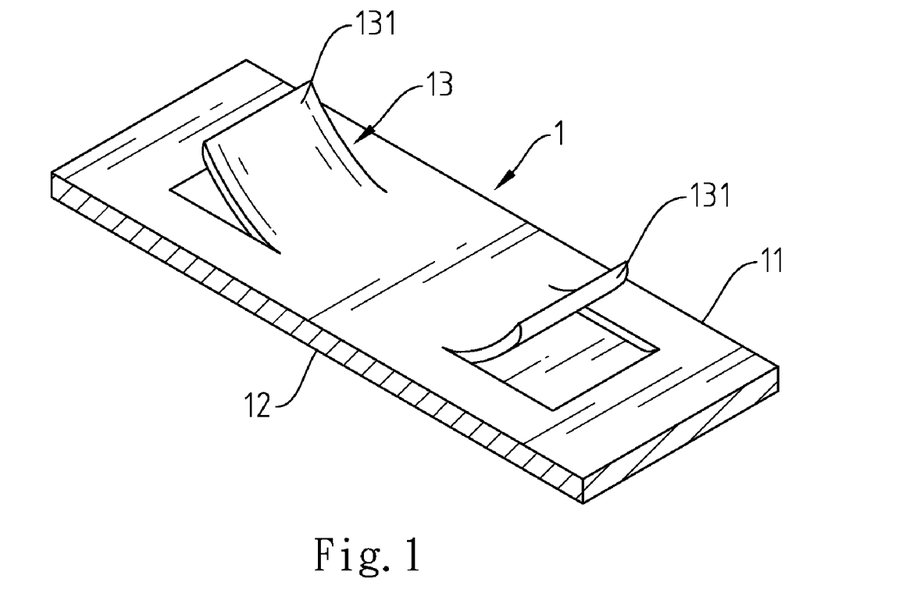
FIG. 1 is an elevational of a part of a metal plate member for composite plate member in accordance with a first embodiment of the present invention.
Figure 2:
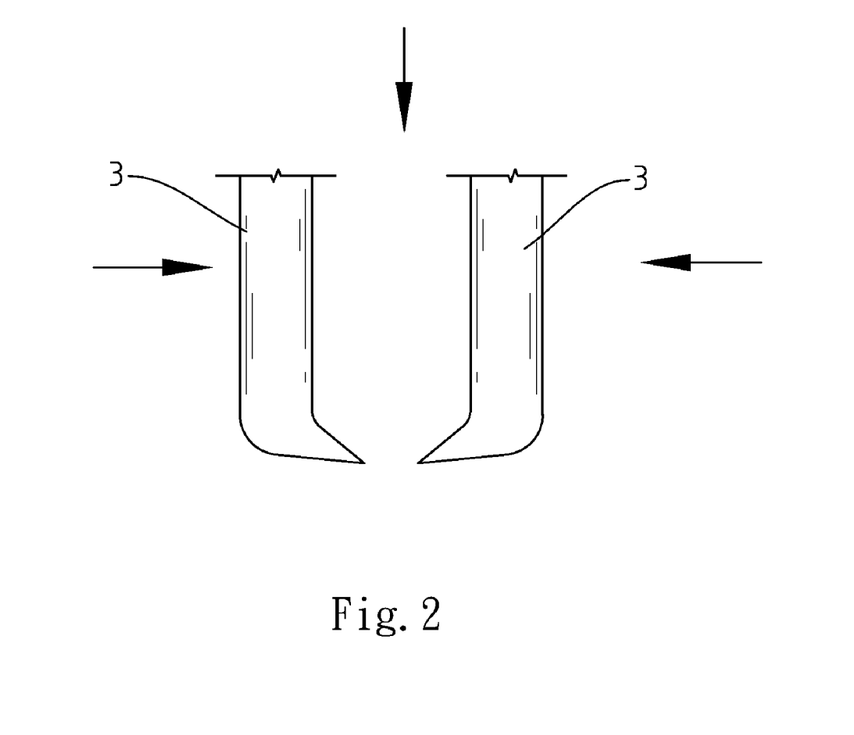
FIG. 2 is a schematic drawing illustrating cutting tools used and operated during fabrication of a composite plate member in accordance with the first embodiment of the present invention.

Referring to FIGS. 1 and 2, a composite plate member is made of a substrate prepared from a metal plate member 1. The metal plate member 1 has opposing outer face 12 and bonding face 11, and a plurality of binding units 13 located on the bonding face 11. Each binding unit 13 includes two binding strips 131 formed of a part of the bonding face 11 and respectively obliquely extending from the bonding face 11 at a predetermined angle in reversed directions. Using cutting tools 3 to cut and lift a part of the bonding face 11 forms the binding units 13.

Figure 3:
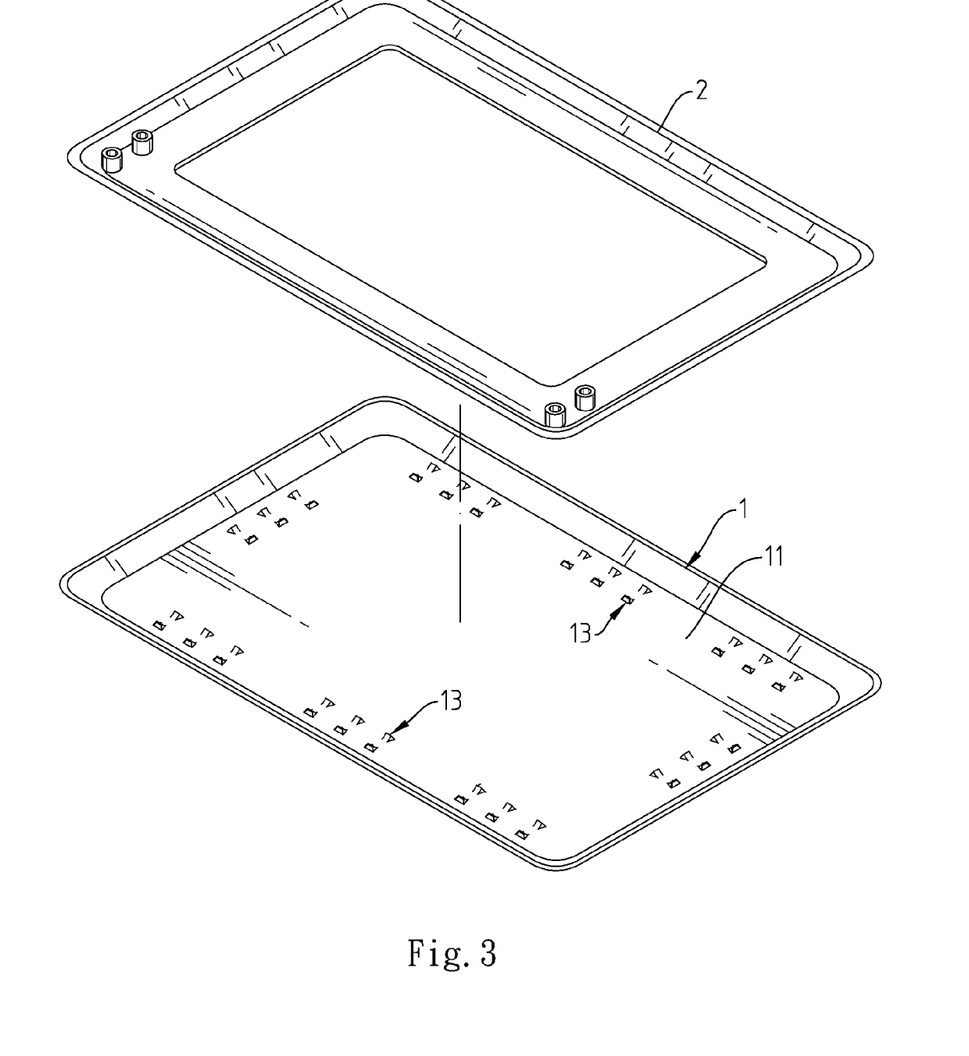
FIG. 3 is an exploded view of a composite plate member in accordance with the first embodiment of the present invention.
Figure 4:
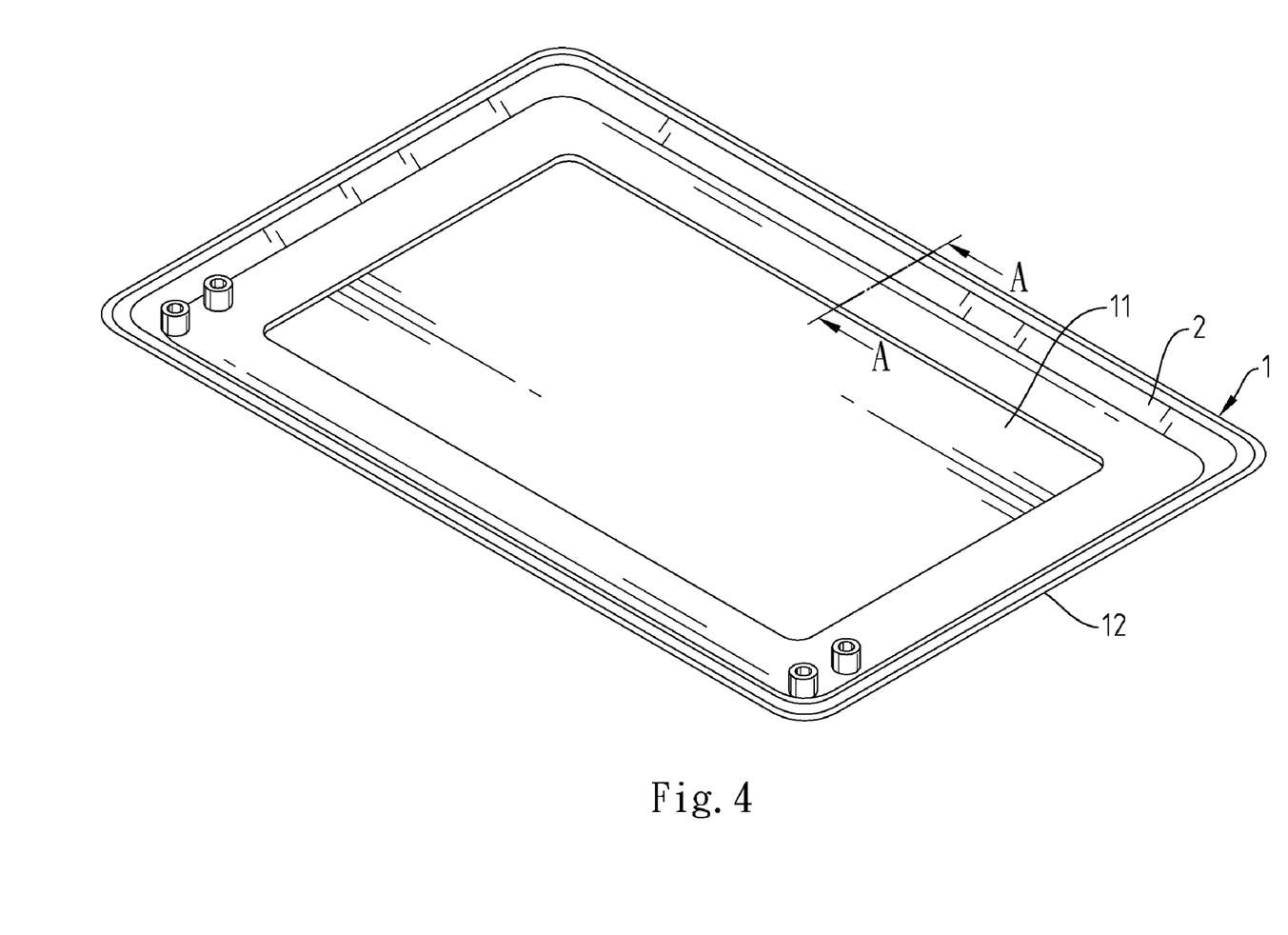
FIG. 4 is an elevational view of the composite plate member in accordance with the first embodiment of the present invention.
Figure 5:
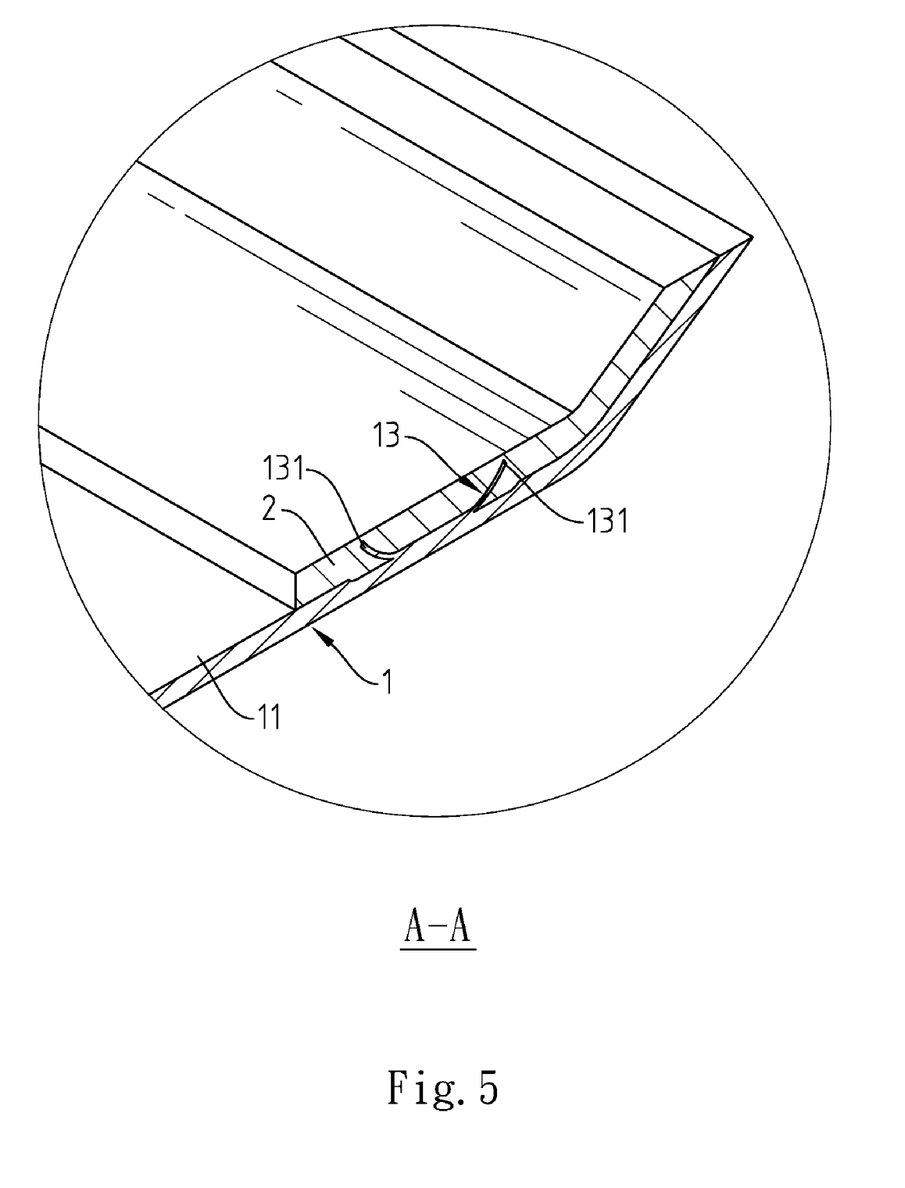
FIG. 5 is a sectional view taken along line A-A of FIG. 4.

Referring to FIGS. 3-5 and FIGS. 1 and 2 again, during fabrication of the composite plate member, cutting tools 3 are used and operated to cut the bonding face 11 of the metal plate member 1 so that an array of binding units 13 is formed at the bonding face 11. Thereafter, put the metal plate member 1 in an insert molding machine (not shown) and then mold a plastic plate member 2 on the bonding face 11 of the metal plate member 1 by insert molding, forming the desired composite plate member. After molding of the plastic plate member 2 on the bonding face 11 of the metal plate member 1, as shown in FIG. 5, the binding strips 131 of the binding units 13 are embedded in the plastic plate member 2, i.e., the metal plate member 1 and the plastic plate member 2 are tightly bonded together.

Figure 6:
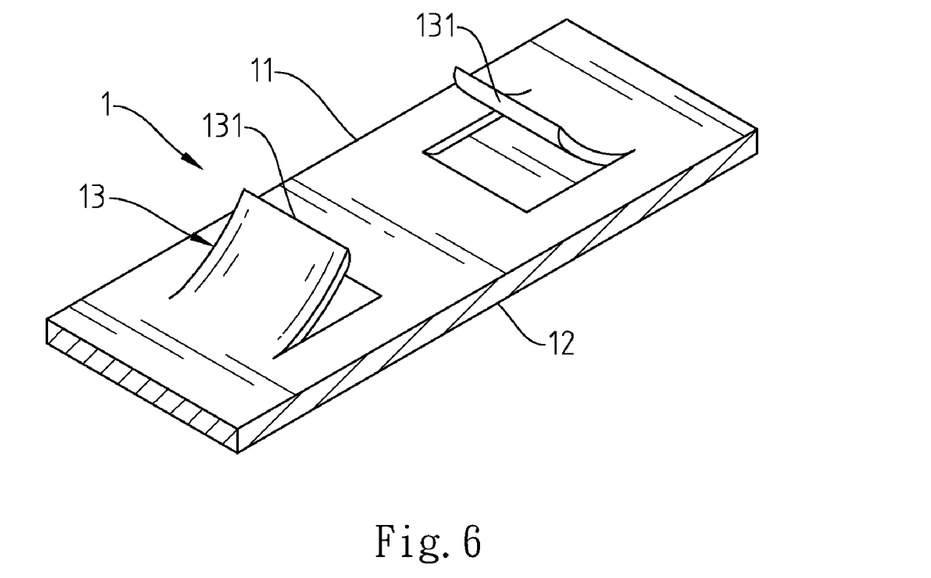
FIG. 6 is an elevational view of a part of a metal plate member for composite plate member in accordance with a second embodiment of the present invention.
Figure 7:
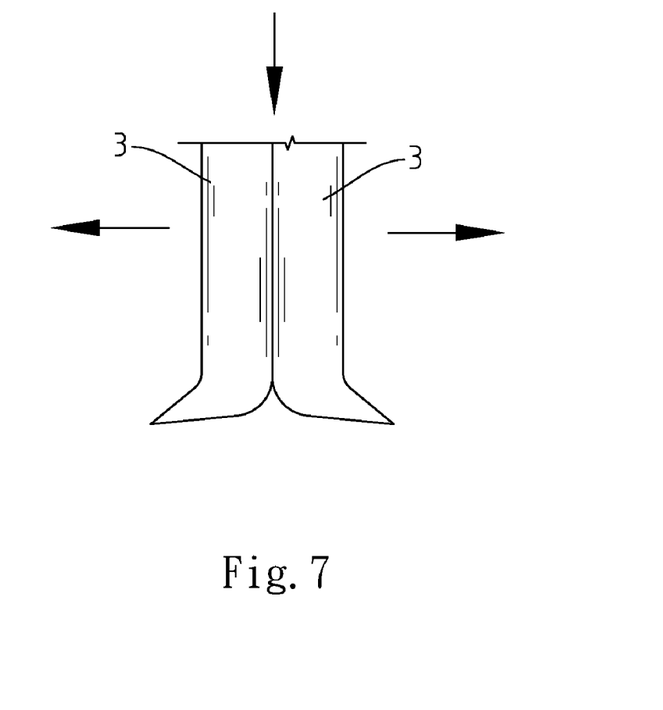
FIG. 7 is a schematic drawing illustrating cutting tools used and operated during fabrication of a composite plate member in accordance with the second embodiment of the present invention.

According to a second embodiment of the present invention, as shown in FIGS. 6 and 7, the binding units 13 are formed at the bonding face 11 by means of using cutting tools 3 to lift a part of the bonding face 11 of the metal plate member 1. The binding strips 131 of the binding units 13 are formed of a part of the bonding face 11 and respectively obliquely extending from the bonding face 11 toward each other. Each binding strip 131 has one end integrally connected to the bonding face 11 and the other end obliquely extended from the bonding face 11 at a predetermined angle. Further, the two binding strips 131 of each binding unit 13 extend from the bonding face 11 in direction toward each other.

Figure 8:
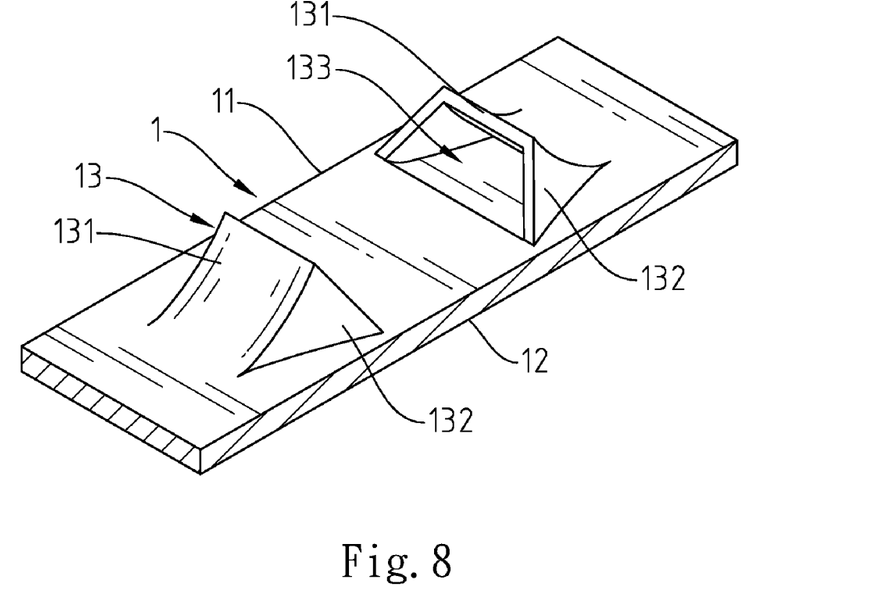
FIG. 8 is an elevational of a part of a metal plate member for composite plate member in accordance with a third embodiment of the present invention.
Figure 9:
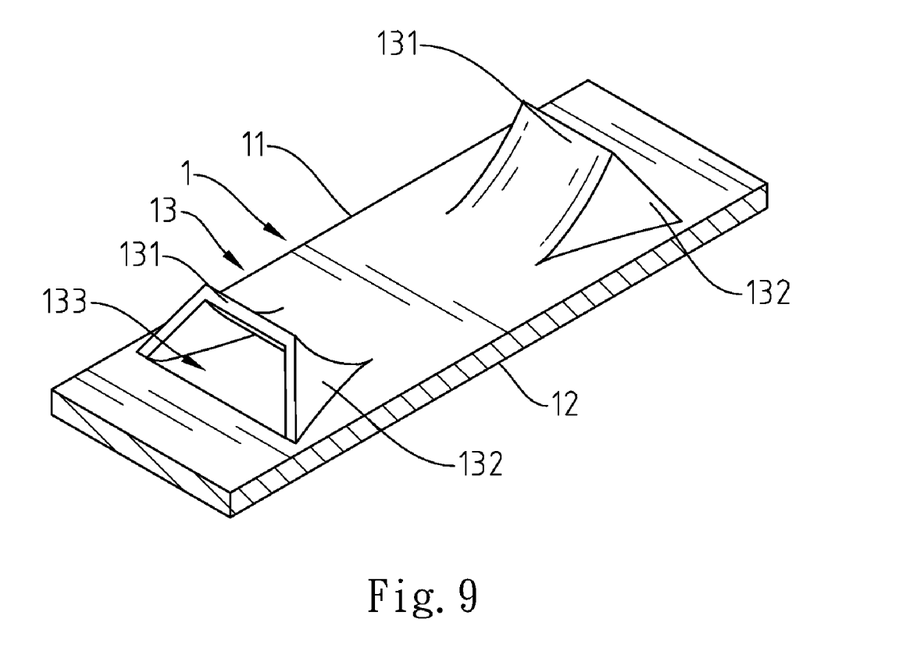
FIG. 9 is an elevational of a part of a metal plate member for composite plate member in accordance with a fourth embodiment of the present invention.
Figure 10:
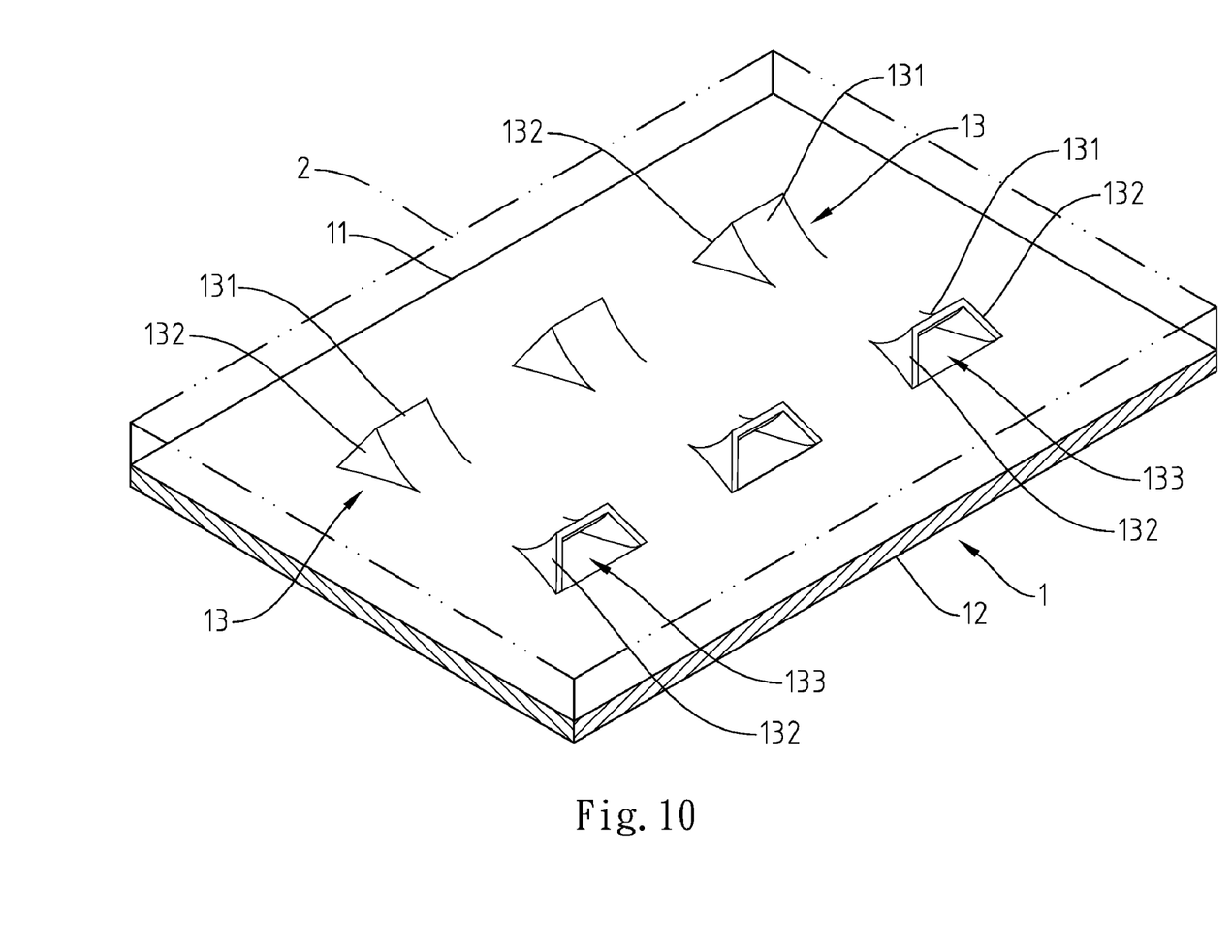
FIG. 10 is a schematic perspective view of a part of the composite plate member in accordance with the fourth embodiment of the present invention.

Referring to third and fourth embodiments of the present invention, as shown in FIGS. 8-10, each binding unit 13 of the metal plate member 1 comprises two binding strips 131 formed of a part of the bonding face 11 and respectively obliquely extending from the bonding face 11 at a predetermined angle in the same direction or reversed directions, two side ribs 132 bilaterally connected between the bonding face 11 and each binding strip 131, and a chamber 133 formed in the bonding face 11 and surrounded by one binding strip 131 and the associating two side ribs 132. After bonding of the plastic plate member 2 on the metal plate member 1, the binding strips 131 and side ribs 132 of the binding units 13 are embedded in the plastic plate member 2, and the plastic material of the plastic plate member 2 filled up the chambers 133, enhancing the binding strength between the metal plate member 1 and the plastic plate member 2.

Figure 11:
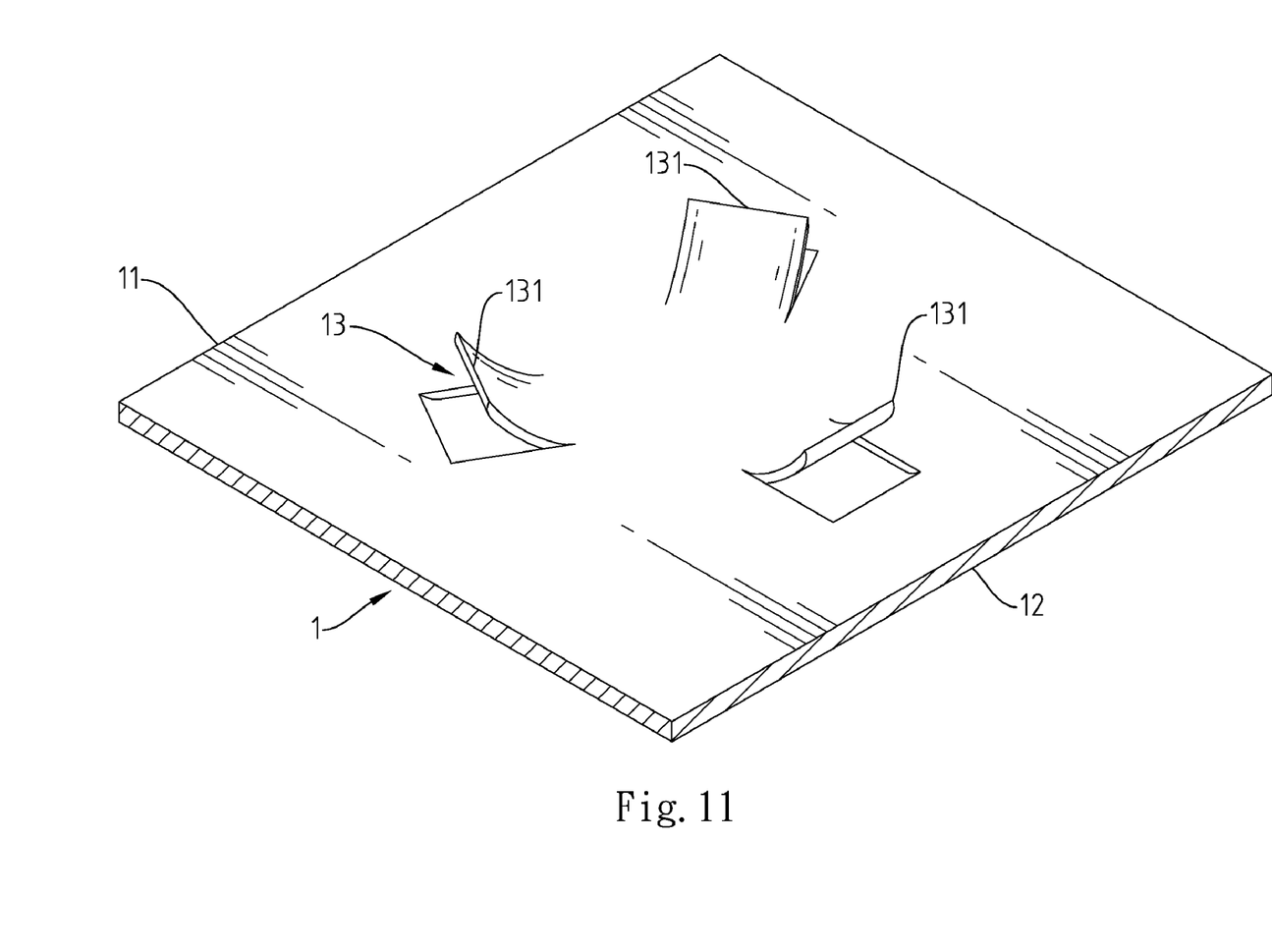
FIG. 11 is an elevational of a part of a metal plate member for composite plate member in accordance with a fifth embodiment of the present invention.
Figure 12:
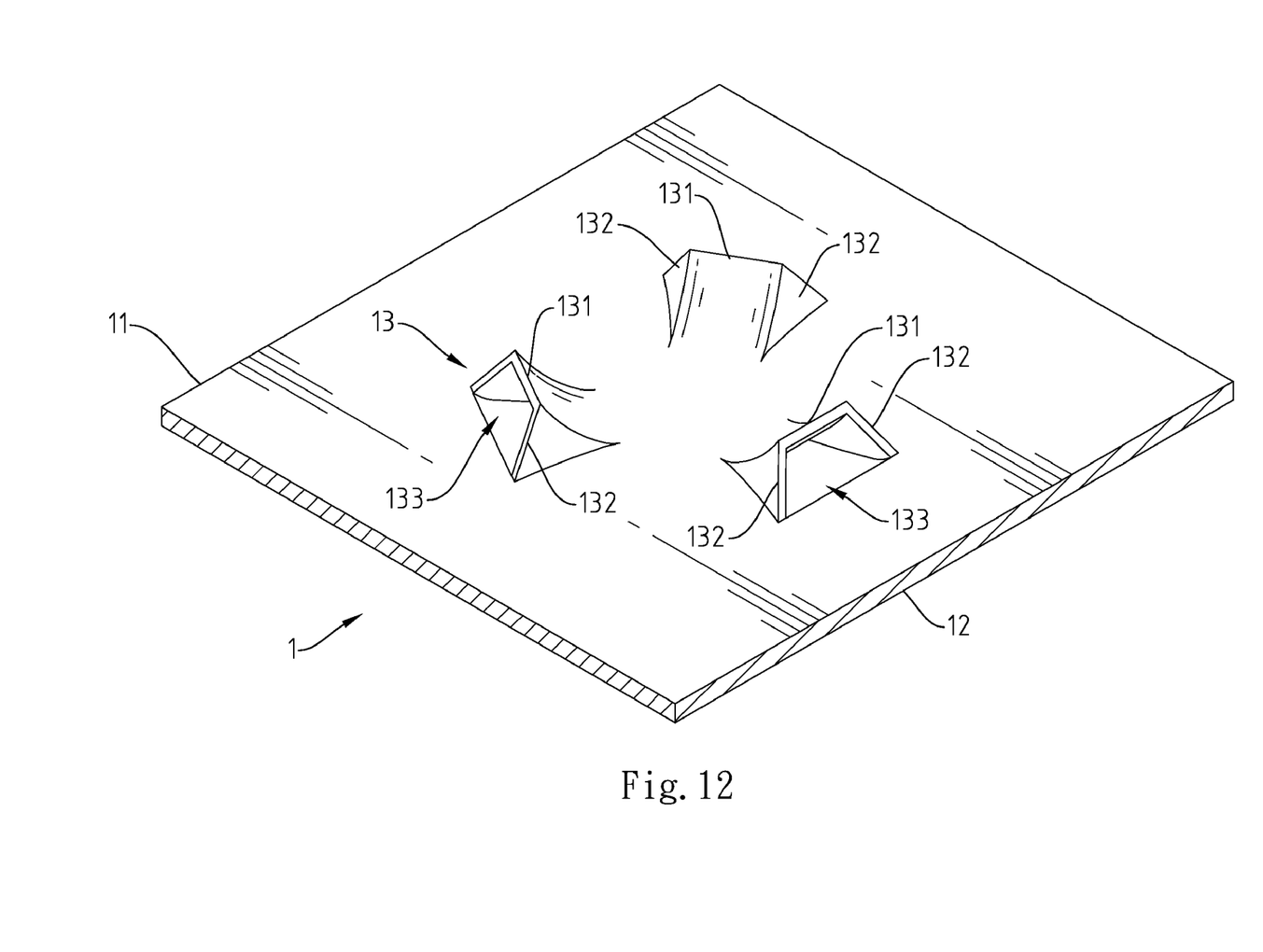
FIG. 12 is an elevational of a part of a metal plate member for composite plate member in accordance with a sixth embodiment of the present invention.

According to fifth and sixth embodiments of the present invention, as shown in FIGS. 11 and 12, each binding unit 13 of the metal plate member 1 comprises a plurality of binding strips 131 formed of a part of the bonding face 11 and respectively obliquely extending from the bonding face 11 at a predetermined angle and arranged in a radial manner. According to the sixth embodiment shown in FIG. 12, two side ribs 132 are bilaterally connected between the bonding face 11 and each binding strip 131, and a chamber 133 is formed in the bonding face 11 and surrounded by one binding strip 131 and the associating two side ribs 132.

Figure 13:
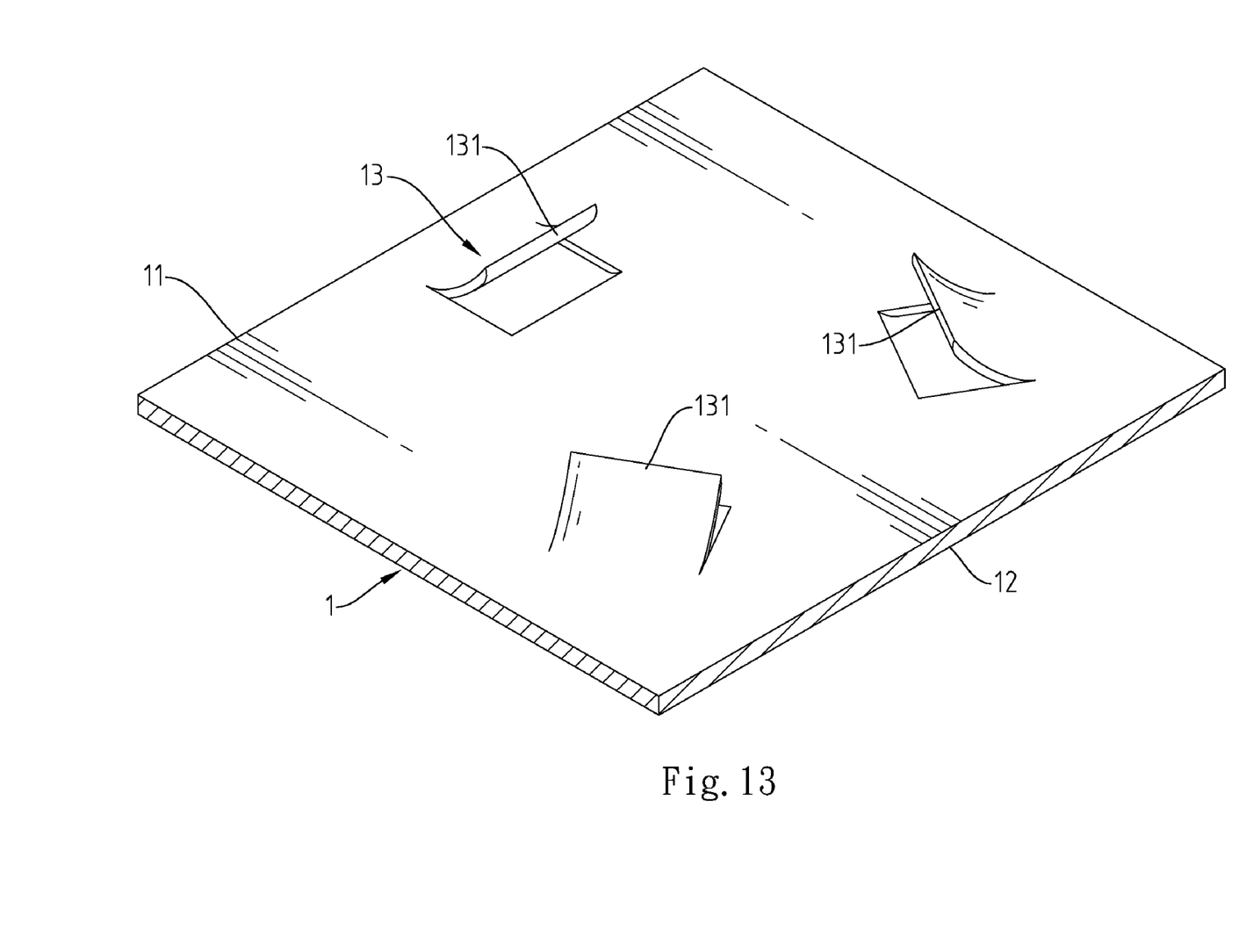
FIG. 13 is an elevational of a part of a metal plate member for composite plate member in accordance with a seventh embodiment of the present invention.
Figure 14:
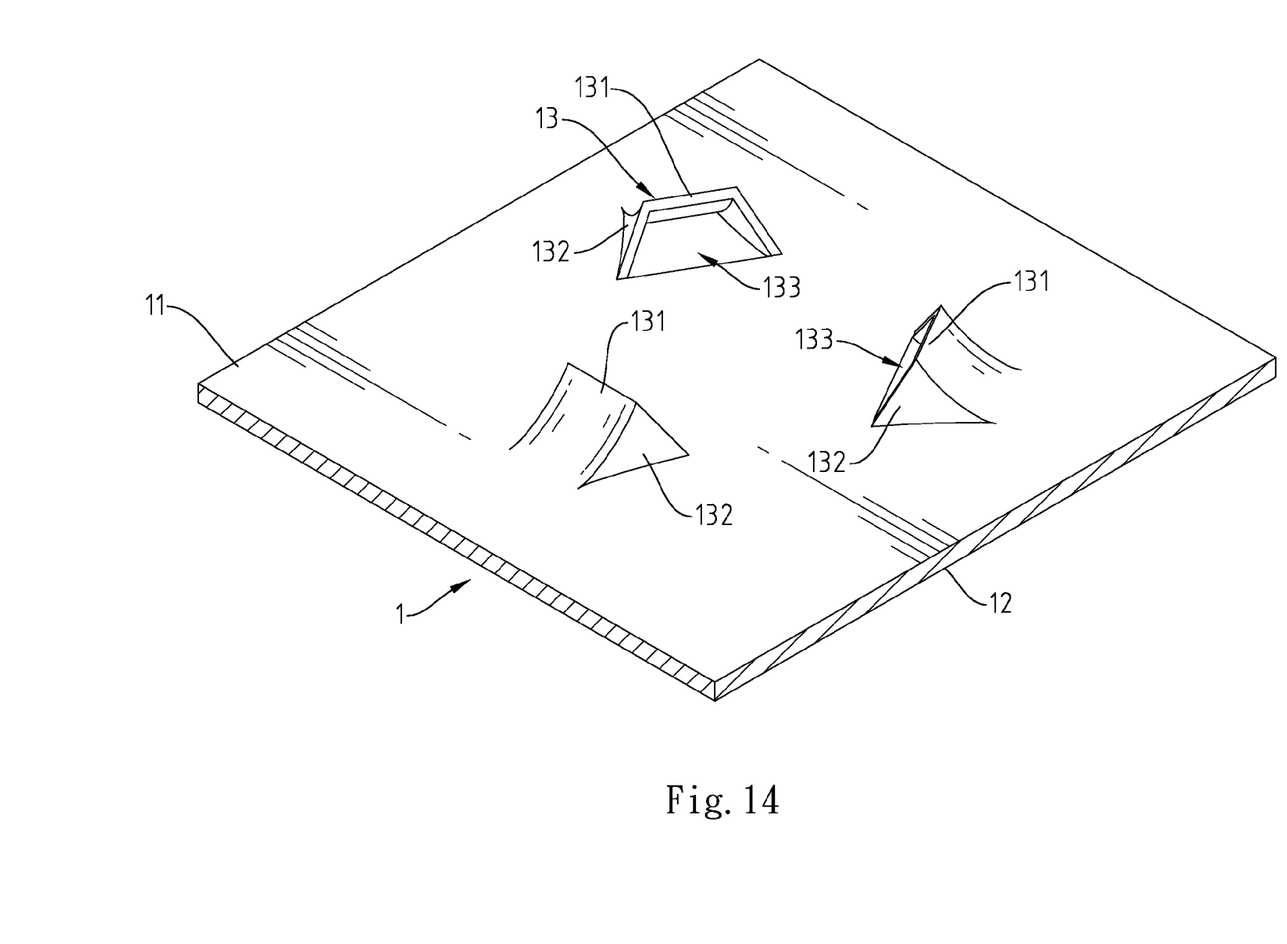
FIG. 14 is an elevational of a part of a metal plate member for composite plate member in accordance with an eighth embodiment of the present invention.

FIGS. 13 and 14 illustrate seventh and eighth embodiments of the present invention. These two alternate forms are substantially similar to the embodiments shown in FIGS. 11 and 12 with the exception of the extending direction of the binding strips 131.

In conclusion, the invention provides a composite plate member that has the advantages over the prior art designs subject to the technical features as follows:

1. After molding of the plastic plate member 2 on the bonding face 11 of the metal plate member 1, the binding strips 131 of the binding units 13 are embedded in the plastic plate member 2, enhancing the binding strength between the metal plate member 1 and the plastic plate member 2 and avoiding separation between the metal plate member 1 and the plastic plate member 2.

2. The binding strips 131 of the binding units 13 can be made to extend obliquely toward each other or one another, or in reversed or different directions so that the binding strips 131 can enhance the torsional strength of the finished composite plate member, avoiding separation between the metal plate member 1 and the plastic plate member 2.

3. Because the binding units 13 are formed at the bonding face 11 by means of using cutting tools 3 to lift a part of the bonding face 11 of the metal plate member 1 but not by means of extrusion deformation, the outer face 12 is kept intact.

4. Because the composite plate member is made by means of molding plastic plate member 2 on the bonding face 11 of the metal plate member 1 by insert molding, the invention has the characteristics of simple manufacturing process and low manufacturing cost.

Although particular embodiments of the invention have been described in detail for purposes of illustration, various modifications and enhancements may be made without departing from the spirit and scope of the invention.

What is claimed is:

1. A composite plate member, comprising:
a metal plate member, said metal plate member comprising opposing outer face and bonding face, and at least one binding unit located on said bonding face, each said binding unit comprising a plurality of binding strips formed of a part of said bonding face and respectively obliquely extending from said bonding face at a predetermined angle, and each said binding unit further comprising a plurality of side ribs connected between said bonding face and two opposite lateral sides of each said binding strip; and
a plastic plate member directly molded on said bonding face of said metal plate member by insert molding to have said binding strips be embedded in said plastic plate member.

2. The composite plate member as claimed in claim 1, wherein the binding strips of each said binding unit extend obliquely toward one another.

3. The composite plate member as claimed in claim 1, wherein the binding strips of each said binding unit extend obliquely in reversed directions.

4. The composite plate member as claimed in claim 1, wherein said metal plate member comprises a plurality of the binding units located on the bonding face thereof.

5. The composite plate member as claimed in claim 1, wherein the binding strips of each said binding unit are made by using a plurality of cutting tools to cut and lift a part of said bonding face of said metal plate member.

6. The composite plate member as claimed in claim 1, wherein the binding strips and side ribs of each said binding unit are made by using a plurality of cutting tools to cut and lift a part of said bonding face of said metal plate member.

7. The composite plate member as claimed in claim 1, wherein the binding strips of each said binding unit respectively obliquely extend from said bonding face at a predetermined angle and are arranged in a radial manner.

* * * * *